E. N. MOOR.
SUPPLEMENTARY HIGH SPEED SPINDLE FOR ENGINE LATHES.
APPLICATION FILED MAY 29, 1918.
1,311,454. Patented July 29, 1919.
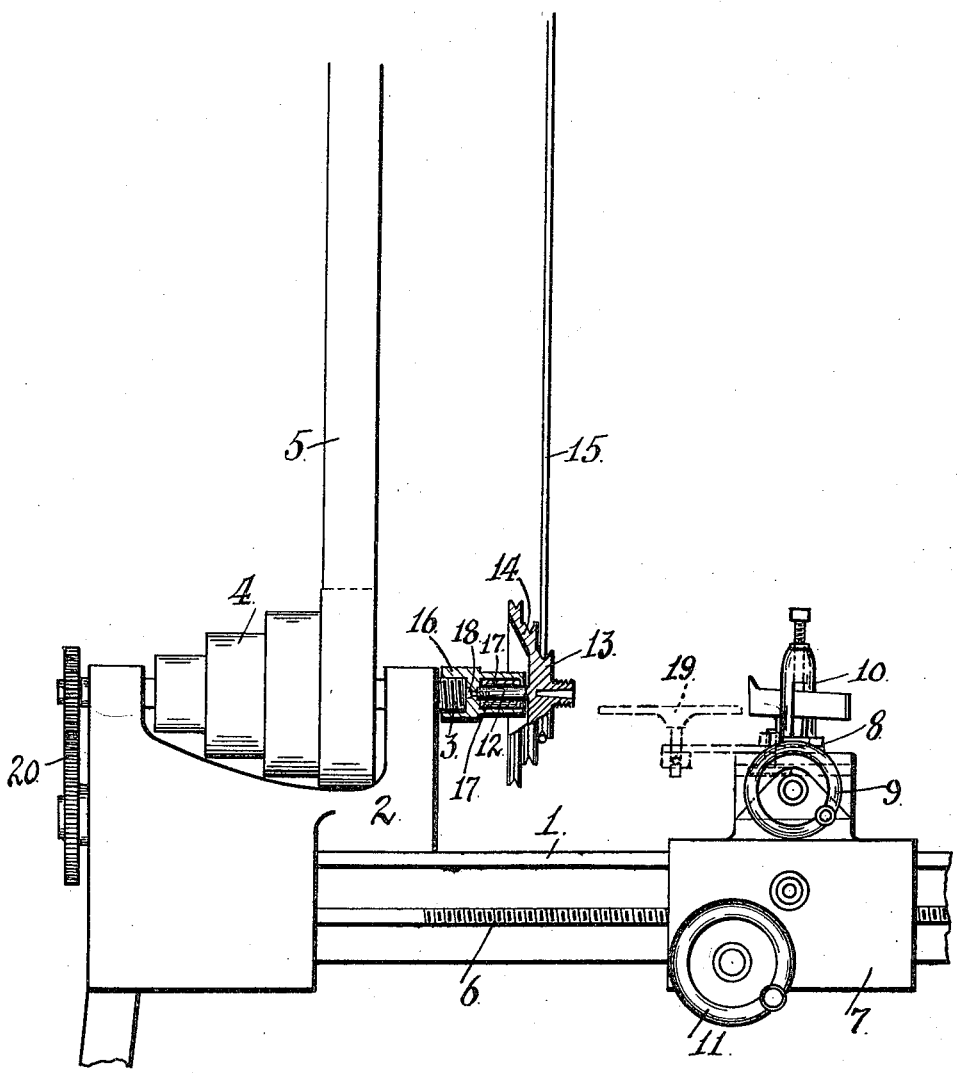

UNITED STATES PATENT OFFICE.

EDWARD N. MOOR, OF OAKLAND, CALIFORNIA.

SUPPLEMENTARY HIGH-SPEED SPINDLES FOR ENGINE-LATHES.

1,311,454.      Specification of Letters Patent.      Patented July 29, 1919.

Application filed May 29, 1918. Serial No. 237,315.

*To all whom it may concern:*

Be it known that I, EDWARD N. MOOR, a citizen of the United States, residing at Oakland, in the county of Alameda and State of California, have invented certain new and useful Improvements in Supplementary High-Speed Spindles for Engine-Lathes, of which the following is a specification.

My invention relates to lathe attachments, and especially to a device which, by reason of its object of converting a low speed machine lathe into a high speed lathe adapted for other and further work, may appropriately be called a supplementary high-speed-spindle for engine lathes.

My invention consists in the novel high speed spindle and in its combination with the lathe, as I shall now fully describe by reference to the accompanying drawing in which the figure is an elevation of a lathe, showing my attachment in section.

1 is the lathe bed in the head-stock 2 of which is mounted the head-stock-spindle 3 driven by the speed-change pulleys 4 and belt 5 in the usual manner.

6 is the lead screw of the apron 7, the cross-feed 8 of which is operated by the hand wheel 9, and carries the tool post 10.

11 is the hand feed wheel for apron 7.

These are all common parts of a lathe and serve to indicate sufficiently any engine or machine lathe.

12 is my supplementary high-speed-spindle. At its outer end it carries and is driven by a face-plate 13 or other head, the periphery of which is formed with the change speed cone pulley 14 driven by a belt 15 from any suitable source of power, independent of the main drive of the lathe, say, for example, by the overhead power device illustrated in my Patent No. 1,200,637, dated October 10, 1916, to which reference may be had. I have not deemed it necessary herein to show such independent power, as it will be understood from the driving belt 15 that a separate power of any nature and in any convenient position may be used to drive the supplementary spindle 12 through the cone pulley 14 of the face plate 13 and said belt 15.

16 is the connecting bearing member which carries the supplementary high-speed spindle 12, and applies it to the head stock spindle 3 of the lathe. In the forward end of this member the supplementary spindle 12 is mounted for rotation on bearings 17, and is held in place by a counter sunk lag bolt 18. The rear end of said member 16 is screwed upon the head-stock spindle 3.

It will now be seen that if the attachment be used to obtain only the high-speed of the supplementary spindle, as, for example, by use of a tool on the T-rest 19, shown in dotted lines, the lead screw 6 may be thrown out of action as its function will not be needed; but if the tool is to be fed to its work automatically, then it will be seen that while the supplementary spindle and its face plate are driven at high speed by the independent power through the belt 15, the feed changes of the lathe can be used simultaneously through its own feed change system, of which the lead-gears 20 form a part, and motion given to the lead screw for actuating the apron and the parts it carries, in the usual manner. Both spindles 3 and 12 rotating on a common center, the lathe proper at its own fixed speed as originally designed, while the supplementary high speed head rotates at a greater speed, adapts the machine for wood turning, and other work requiring high speed. Thus the relatively low speed engine or machine lathe is readily converted into a high speed lathe for any purpose desired.

I claim:—

1. A supplementary high-speed attachment for engine or machine lathes comprising a spindle; a member in which said spindle is rotatably journaled, said member being adapted for detachable fitting upon the head-stock-spindle of the lathe; and means for driving said first named spindle independently of the rotation of the head-stock spindle.

2. A supplementary high-speed attachment for engine or machine lathes comprising a spindle; a head carried thereby and having its periphery formed with a series of pulleys of varying diameters; an independently driven belt coöperating with the pulleys to drive the head and spindle; and a member in which said spindle is journaled, provided with means for detachably connecting it with the head stock spindle of the lathe.

3. A supplementary high-speed attachment for engine or machine lathes comprising a spindle; a head carried thereby and having its periphery formed with a series of pulleys of varying diameters; an independently driven belt coöperating with the pulleys to drive the head and spindle; and a connecting bearing member, in the forward end of which the spindle is journaled, the rear end of said member being screwed upon the head stock spindle of the lathe.

4. In combination with the head-stock-spindle, lead screw and apron of an engine or machine lathe, a supplementary spindle; a head carried thereby, provided with driving means independent of the head-stock spindle driving means; and a member in which said supplementary spindle is journaled, provided with means for detachably connecting it with the head stock spindle.

5. In combination with the head-stock-spindle, lead screw and apron of an engine or machine lathe, a supplementary spindle; a head carried thereby, the periphery of which is formed with a speed-varying pulley; a member in which said supplementary spindle is journaled, said member being screwed upon the head-stock spindle of the lathe; and a belt from a source of power independent of the lathe, to said pulley for independently driving the supplementary spindle.

In testimony whereof I have signed my name to this specification in the presence of two subscribing witnesses.

EDWARD N. MOOR.

Witnesses:
Wm. F. Booth,
D. B. Richards.

Copies of this patent may be obtained for five cents each, by addressing the "Commissioner of Patents, Washington, D. C."